(12) United States Patent
Amir et al.

(10) Patent No.: US 8,619,754 B2
(45) Date of Patent: Dec. 31, 2013

(54) ROBUST CHANNEL ALLOCATION METHOD FOR RF COMMUNICATION SYSTEMS

(75) Inventors: Haim Amir, Ramat Hasharon (IL); Ofer Guttman, Moshav Hadar Am (IL); Amir Eliaz, Moshav Ben-Shemen (IL)

(73) Assignee: Essence Security International Ltd., Herzelia (IL)

( * ) Notice: Subject to any disclaimer, the term of this patent is extended or adjusted under 35 U.S.C. 154(b) by 853 days.

(21) Appl. No.: 12/354,070

(22) Filed: Jan. 15, 2009

(65) Prior Publication Data
US 2010/0177762 A1 Jul. 15, 2010

(51) Int. Cl.
*H04J 3/06* (2006.01)

(52) U.S. Cl.
USPC ....................................... 370/350

(58) Field of Classification Search
USPC ......... 370/203, 204–215, 229–240, 241–253, 370/310–337, 338–350, 395.1, 395.3, 370/395.4, 395.41, 395.42, 395.5, 395.52, 370/395.53, 412–421, 431–457, 458–463, 370/464–497, 498–529
See application file for complete search history.

(56) References Cited

U.S. PATENT DOCUMENTS

| | | | |
|---|---|---|---|
| 5,987,024 A * | 11/1999 | Duch et al. ................ | 370/350 |
| 6,192,230 B1 * | 2/2001 | van Bokhorst et al. .... | 455/343.3 |
| 7,095,754 B2 * | 8/2006 | Benveniste ................ | 370/465 |
| 7,564,842 B2 * | 7/2009 | Callaway et al. .......... | 370/389 |
| 7,633,996 B2 * | 12/2009 | Haentzschel et al. ...... | 375/150 |
| 7,688,775 B2 * | 3/2010 | Ramkumar et al. ........ | 370/321 |
| 7,701,858 B2 * | 4/2010 | Werb et al. ................ | 370/241 |
| 7,715,885 B2 * | 5/2010 | Arunan et al. ............. | 455/574 |
| 7,920,545 B2 * | 4/2011 | Eguchi ...................... | 370/350 |
| 2003/0152059 A1 * | 8/2003 | Odman ...................... | 370/338 |
| 2008/0095126 A1 | 4/2008 | Mahany | |
| 2008/0165761 A1 | 7/2008 | Goppner | |
| 2008/0232286 A1 * | 9/2008 | Habetha et al. ............ | 370/311 |
| 2008/0253354 A1 * | 10/2008 | Eguchi ...................... | 370/350 |
| 2009/0010210 A1 * | 1/2009 | Hiertz et al. ............... | 370/329 |
| 2009/0051496 A1 * | 2/2009 | Pahlavan et al. ........... | 340/10.2 |
| 2009/0257410 A1 * | 10/2009 | Liu ........................... | 370/336 |
| 2010/0142423 A1 * | 6/2010 | Zhu et al. .................. | 370/311 |
| 2010/0142509 A1 * | 6/2010 | Zhu et al. .................. | 370/343 |
| 2010/0195601 A1 * | 8/2010 | Zhang ....................... | 370/329 |

* cited by examiner

*Primary Examiner* — Jung-Jen Liu
(74) *Attorney, Agent, or Firm* — Mark M. Friedman

(57) ABSTRACT

A method of allocating channels in a PTMP (point-to-multipoint) system having a master and a plurality of nodes comprising the steps of: transmission by the master to the nodes of a synch beacon, the sync beacon having a first frequency and a substantially fixed time period between successive sync beacon transmissions; dividing the time period into a slotted time and an unslotted time; allocating a plurality of slots in the slotted time for RF activity of the nodes that have resolved the sync beacon; and identifying the unslotted time for unallocated RF activity of the nodes that have not resolved the sync beacon.

16 Claims, 5 Drawing Sheets

FIG 1 – Prior Art

ROBUST CHANNEL ALLOCATION METHOD FOR RF COMMUNICATION SYSTEMS

FIELD AND BACKGROUND OF THE INVENTION

The present invention relates to channel allocations in RF communications systems and specifically to a robust channel allocation method for PTMP (point-to-multi-point) systems.

In the specification and claims which follow below, the terms "master" and "node" are intended to mean both a schematic/configuration position within an RF network and one or more RF devices typically transmitting and/or receiving at or associated with the respective schematic/configuration position. Typically, the "device" is a radio device. Typically in a PTMP system, the master is the central, coordinating point whereas one or more nodes comprise "multi points".

Reference is now made to FIG. 1, which is schematic time line diagram of signals 10 in a prior art master-node communications system. In low power wireless communications systems with star topology—such as a PTMP system—where many nodes need to stay connected to a master, one of the options is to have the master transmit a beacon 12 (also called a "sync beacon") which is "visible" to all of the nodes, as known in the art. The purpose of the sync beacon is to serve to allow high precision clock synchronization for individual node transmission activities, thereby ensuring orderly overall communication system functioning. In the time between consecutive beacon 12 transmission, a period 14 is identified in which RF activity takes place, such as transmissions/receptions by individual nodes and/or the master. Depending on the system size and characteristics, the beacon is typically transmitted at a frequency on the order of approximately many times a second, although the frequency may be higher or lower. When transmission by a node is necessary, the node "searches" (i.e. waits to receive) for the sync beacon. Referring to the figure, once beacon 12 is found, the node can be synchronized with relatively high time resolution, as known in the art, to transmit at/in an allocated, predefined slot 18.

In the specification and claims which follow below, the terms "slot" and "channel" are intended to mean the typical time allocation, as know in the art, for respective, individual node activity (i.e. transmission and/or reception) within the network. Nodes may use slotted ALOHA, slotted CSMA or any other mechanism/algorithm as know in the art to resolve potential transmission "collisions", i.e. when two or more nodes undesirably substantially simultaneously transmit on the same slot.

Depending on the system size and characteristics there can be on the order of approximately 20 to 500 slots allocated between beacons, with a time duration of the slot ranging typically from approximately 200 to 2,000 microseconds. A sync beacon is useful, inter alia, in systems employing nodes with reduced or limited power consumption, as described hereinbelow.

US Patent Application no. 20080232286 by Habetha et al., whose disclosure is incorporated herein by reference, describes a system and method for hibernation mode for beaconing device. Habetha describes, inter alia, a way to inform the network on a beacon allocation of other device that is currently in a low power mode.

US Patent Application 20080095126 by Mahany et al., whose disclosure is incorporated herein by reference, describes a low-power wireless beaconing network supporting proximal formation, separation and reformation. US Patent Application no. 20080165761, by Goppner et al., whose disclosure is incorporated herein by reference, describes a method for synchronization and data transmission in a multi-hop network. These prior art all describe and/or relate to beaconing.

A standard called "ZigBee", whose disclosure is incorporated herein by reference, is also related to low power wireless communications systems using a beacon. ZigBee, developed by the ZigBee Alliance, is a very low-cost, very low-power consumption, two-way, wireless communications standard. Applications adopting the ZigBee standard are to be embedded in consumer electronics, home and building automation, industrial controls, PC peripherals, medical sensor applications, toys, and games. At its core, Zigbee (http://www.zigbee.org/en/) describes a mesh network architecture. Wireless mesh networks were originally developed for military applications but have undergone significant evolution in the past decade. As the cost of radios has plummeted, single radio products have evolved to support more radios-per-mesh node. Additional radios per mesh node additional provide specific functions, such as client access, backhaul service, or scanning radios for high speed handover in mobility applications. Mesh node design also became more modular, meaning one box could support multiple radio cards, each card operating at a different frequency.

When a node is operated in a very low power consumption mode, meaning it is normally powered off for long periods of time and/or powered on for very short periods of time; effective node synchronization within the network becomes more difficult. A problem exists when one or more nodes in a network cannot find/receive the sync beacon for conventional synchronization and subsequent slotted transmission activity. In the specification and claims which follow, the term "resolve", as used in "resolve the beacon", is intended to mean that the node has received the sync beacon and has been synchronized with the master in relatively high time resolution, as known in the art, to transmit at/in an allocated slot.

There is therefore a need for a way to allocate channels for one or more nodes operating in a low power consumption mode, taking advantage of available RF spectrum, even when the sync beacon cannot be resolved by a node.

SUMMARY OF THE INVENTION

The present invention relates to channel allocations in RF communications systems and specifically to a robust channel allocation method for PTMP systems.

According to the teachings of the present invention there is provided, a method of allocating channels in a PTMP (point-to-multi-point) system having a master and a plurality of nodes comprising the steps of: transmission by the master to the nodes of a synch beacon, the sync beacon having a first frequency and a substantially fixed time period between successive sync beacon transmissions; dividing the time period into a slotted time and an unslotted time; allocating a plurality of slots in the slotted time for RF activity of the nodes that have resolved the sync beacon; and identifying the unslotted time for unallocated RF activity of the nodes that have not resolved the sync beacon. Preferably, at least one of the plurality of nodes stands by to receive the sync beacon, after which the node transmits during the unslotted time if the sync beacon is not resolved within a plurality of time periods. Most preferably, the node transmits during the slotted time if the sync beacon is resolved within the plurality of time periods. Most typically, at least one of the plurality of nodes is operated in a low power consumption mode.

Preferably, the low power consumption mode comprises the node normally not being powered to receive the sync beacon. Most preferably, the node is periodically momentarily powered to perform a coarse synchronization. Typically, the coarse synchronization is performed every n time periods, n ranging from 100 to 10,000. Most typically, the momentarily powering comprises a time duration of a plurality of time periods.

According to the teachings of the present invention there is further provided a PTMP (point-to-multi-point) system having a master and a plurality of nodes, the system having an allocation of channels, the system comprising: a synch beacon transmittable by the master to the nodes, the sync beacon having a first frequency and a time period between successive sync beacon transmissions; a division of the time period into a slotted time and an unslotted time; a plurality of slots allocatable in the slotted time for RF activity of the nodes that have resolved the sync beacon; and the unslotted time for unallocated RF activity of the nodes that have not resolved the sync beacon. Preferably, at least one of the plurality of nodes is adapted to stand by to receive the sync beacon, after which the node is adapted to transmit during the unslotted time if the sync beacon is not resolved within a plurality of time periods. Most preferably, the node is adapted to transmit during the slotted time if the sync beacon is resolved within the plurality of time periods. Most typically, at least one of the plurality of nodes is adapted to be operated in a low power consumption mode.

Preferably, the low power consumption mode comprises the node adapted to normally not being powered to receive the sync beacon. Most preferably, the node is periodically momentarily powered to perform a coarse synchronization. Typically, the coarse synchronization is performable every n time periods, n ranging from 100 to 10,000. Most typically, the momentarily powering comprises a time duration of a plurality of time periods.

BRIEF DESCRIPTION OF THE DRAWINGS

The invention is herein described, by way of example only, with reference to the accompanying drawings, wherein.

DESCRIPTION OF PREFERRED EMBODIMENTS

The present invention relates to channel allocations in RF communications systems and specifically to a robust channel allocation method for PTMP systems.

Figure 1:
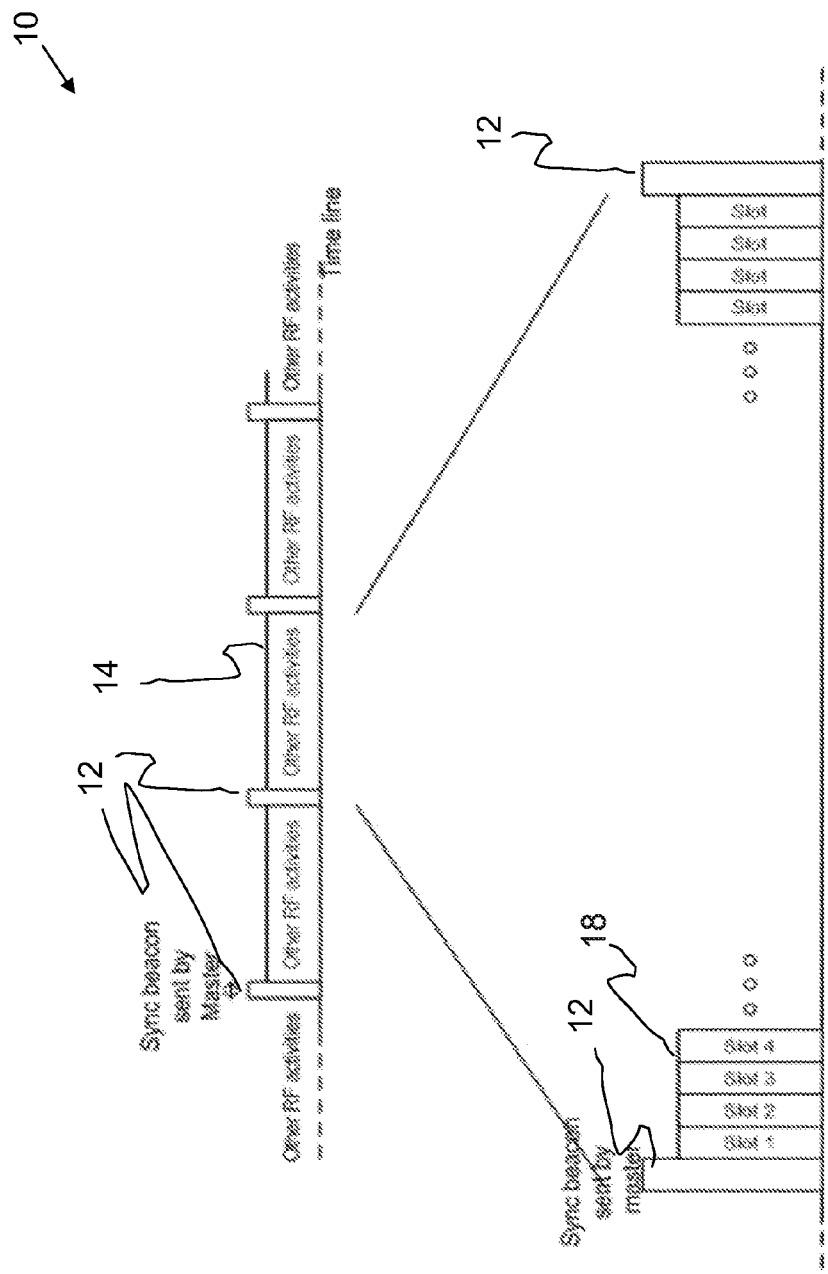
FIG. 1 is a schematic time line diagram of signals in a prior art master-node communications system.
Figure 2:
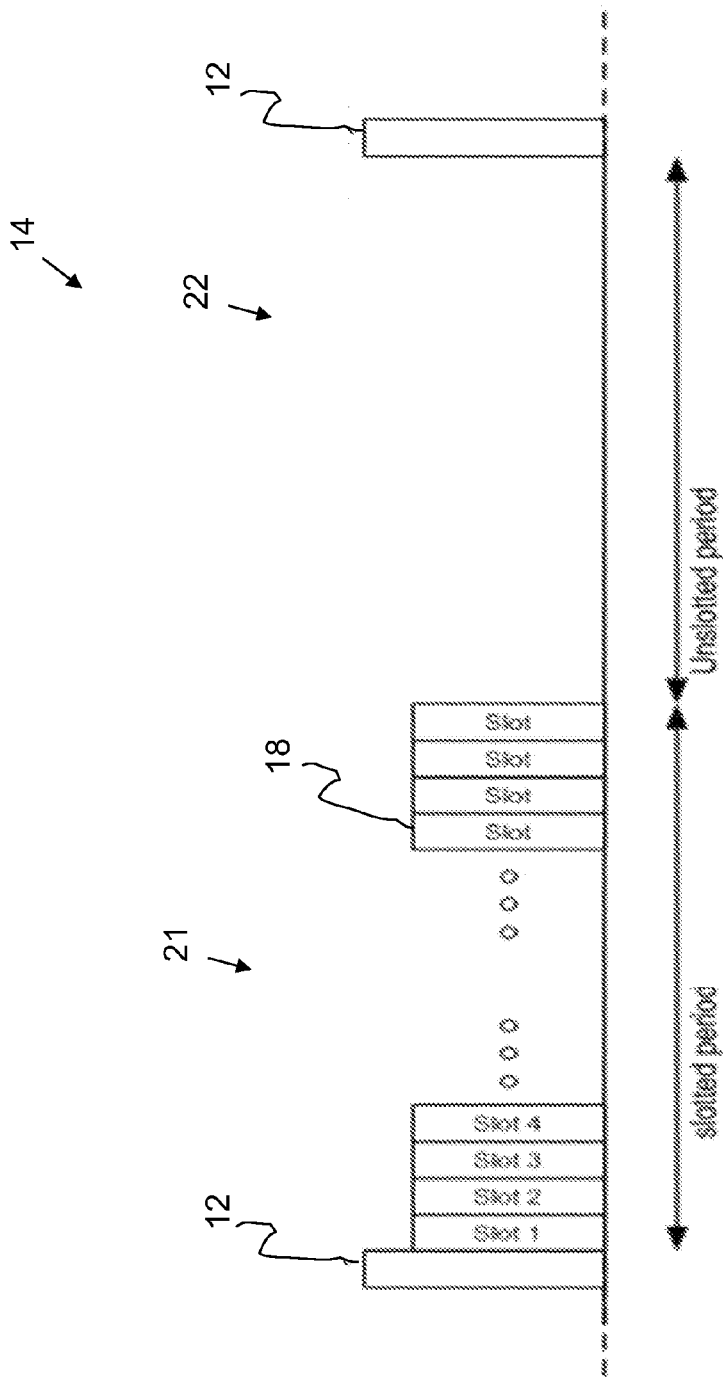
FIG. 2 is a schematic time line diagram of FIG. 1, showing a slotted and an unslotted time period, in accordance with an embodiment of the present invention.

Reference is now made to FIG. 2, which is the schematic time line diagram of FIG. 1, showing a slotted time period 21 and an unslofted time period 22, in accordance with an embodiment of the present invention. Apart from differences described below, beacon 12, period 14, and slot 18 are identical in configuration, operation, and functionality to those shown in FIG. 1 and as described hereinabove. Period 14 is the time period between successive beacons. The period is divided into slotted time 21 and unslotted time 22. When a node resolves the sync beacon, the node is synchronized for timely, controlled communication activity during slotted time period 21 as noted herein above.

However, when the node cannot resolve the sync beacon (such as, but not limited to: poor or jammed reception; error in clock synchronization; or any other contributing reason) it is possible nonetheless for the node to begin transmission. Since synchronization is lacking, there is a chance that the transmission will not take place during the slotted time 21 (i.e. not in an allocated slot); or if during the slotted time, node transmission may not take place exactly within an allocated slot (i.e. transmission will "miss" a slot and/or overlap one or more slots). In the communication mode described immediately above, the node transmission after non-resolution of the beacon may interfere with one or more transmissions of synchronized nodes or of the sync beacon, especially during slotted time 21. In an embodiment of the current invention, a solution to this problem is to use unslotted time 22 for such transmissions, the unslotted time typically requiring less synchronization precision as compared with transmissions during the slotted time period. The following figure expands upon this concept.

Figure 3:
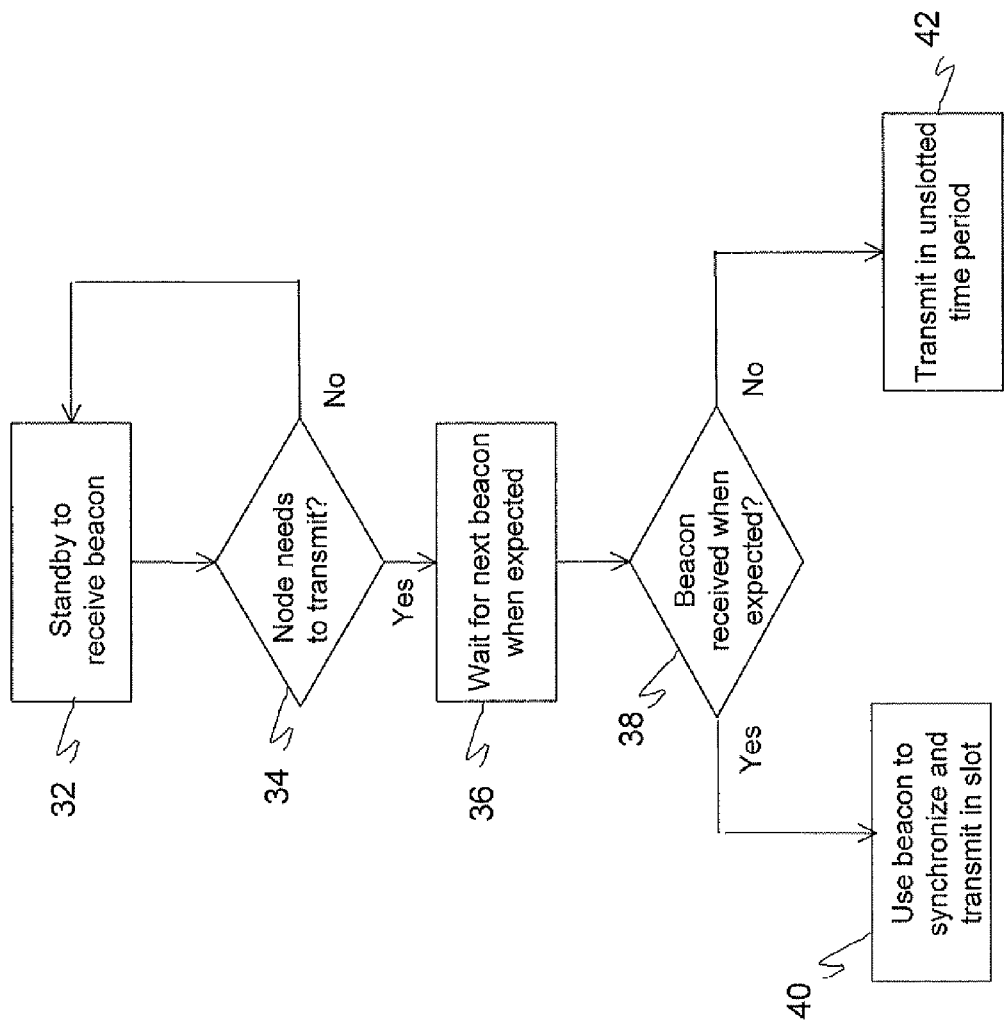
FIG. 3 is a flow chart showing the sequence of events for node transmission in the slotted and unslotted time periods, in accordance with an embodiment of the current invention.
Figure 4:
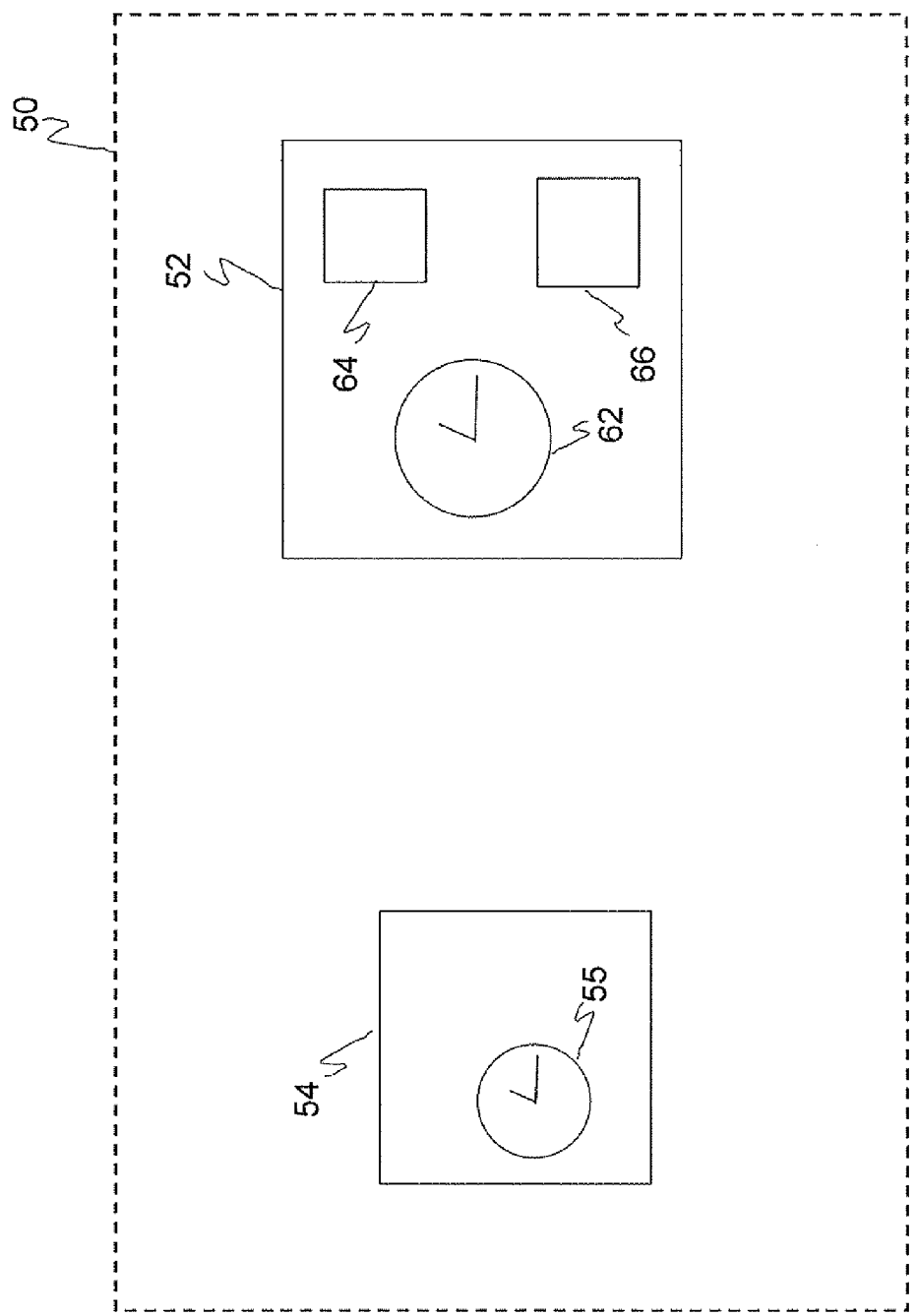
FIG. 4 is a schematic block diagram of a PTMP system with the master and nodes, in accordance with an embodiment of the current invention.

Reference is now made to FIG. 3, which is a flow chart showing the sequence of events for node transmission in the slotted and unslotted time periods, and to FIG. 4, which is a schematic block diagram of a PTMP system 50 with a typical node 52 and a master 54, in accordance with an embodiment of the current invention.

The first step in FIG. 3, "Standby to receive beacon" 32, is a typical operating condition of the node, meaning it is "listening"—i.e. powered and ready to receive a sync beacon transmitted by the master. The node may be powered for an extended period of time prior to being in the standby mode or it may just have been powered up, such as but not limited to after a "wake up" action following a hibernation period meant to conserve node power in a low power consumption mode. Typically, the node resolves one or more sync beacons in the standby mode, allowing it to be synchronized with the master even if it should "miss" a few beacons over time. Since a typical sync beacon transmission frequency is on the order of approximately many times a second, as noted hereinabove, a node would typically need less than one second in which to resolve the sync beacon. Additional discussion of this point follows hereinbelow.

The following decision "Node needs to transmit?" 34 may occurs after step 32. Typically, a "wake up" situation, as noted above, comes about because there is a need for the node to transmit. If this is the case, then step 34 follows very closely after step 32—a typical sequence of events for very low power operation of the node. On the other hand, if the node has been powered for some time, being on standby, time may pass until there is a need to transmit. If there is no need to transmit, then control reverts to step 32, meaning the node continues to remain in standby to receive the beacon. However, if there is a need to transmit, flow transfers to step 36, "Wait for next beacon when expected".

A better understanding of step 36, is obtained by presently referring to FIG. 4. Master 54 includes, inter alia, a master clock 55, according to which sync beacons are transmitted and other transmissions are performed, as noted hereinabove. Node 52 includes, inter alia, a node clock 62, processing and communications electronics 64, and a power source 66. Power source 66 is usually a battery, but the power source may optionally or alternatively be mains powered, solar cell power, or any other power source. Node clock 62 provides precision timing for node communications within system 50, especially following synchronization with the master, i.e., after resolution of a sync beacon. Typically, node transmission occurs a short time after the node clock is synchronized with the master clock—usually following from one to a few sync beacons.

It should be noted that both master clock 55 and node clock 62 normally exhibit some drift, meaning an inherent inaccuracy of the respective clocks over time. Both clocks typically give respective indications of the next beacon transmission. However, due to the drift noted above, when synchronization is not performed for an extended time (usually on the order of many minutes or even hours) there can be a difference between the timing of both clocks. The difference in the timing between both clocks is what may preclude the node from transmitting at a precise slot; however the difference in timing may not preclude the node from transmitting in the unslotted time, as noted hereinabove. For example, in a hibernation condition or any other condition when the node has not resolved the sync beacon, node clock 62 continues to function and may usually provide sufficient timing resolution to allow the node to estimate sync beacon timing and/or unslotted time, as described hereinabove (refer to FIG. 2).

Returning to FIG. 3, in step 36, the node anticipates the next expected sync beacon transmission. Following step 36 is decision 38, "Beacon received when expected?". If the beacon is received when expected—meaning there is substantially high precision of synchronization between the node clock and the master clock, control continues to step 40. Use beacon to synchronize . . . " and the node proceeds to resolve the sync beacon and to transmit in an allocated slot—within the slotted time—as described previously hereinabove. However, it is also possible that the beacon is not received when expected—most typically because of lack of precise synchronization between the node clock and the master clock. In this situation, control reverts to step 42, "Transmit in unslotted time period" and the node attempts to transmit in the estimated unslotted time period, according to the node clock information.

In the communication mode described immediately above, there exists the possibility of transmission of a node after not resolving the beacon. One possibility is that the transmission will interfere with one or more transmissions of other synchronized nodes in the system. Embodiments of the current invention serve to reduce the possibility of interference as noted hereinabove. In addition, the node may be able to resolve the sync beacon on a successive sync beacon transmission as described hereinabove.

Figure 5:
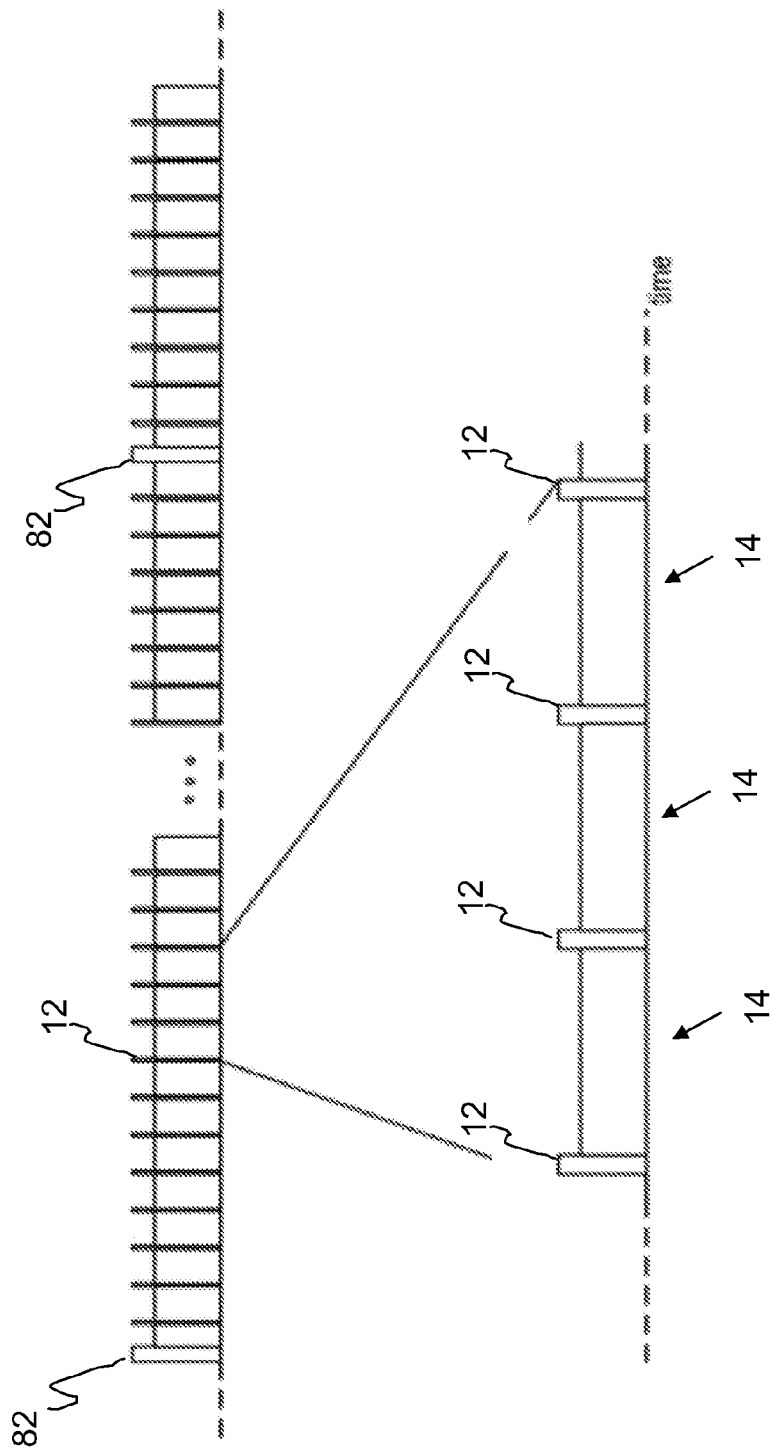
FIG. 5 is the schematic time line diagram of FIG. 2, showing a coarse synchronization, in accordance with an embodiment of the present invention.

Reference is now made to FIG. 5, which is the schematic time line diagram of FIG. 2, showing a coarse synchronization 82 in accordance with an embodiment of the present invention. Apart from differences described below, beacons 12 and periods 14 are identical in configuration, operation, and functionality to those shown in FIGS. 1 and 2 and as described hereinabove. Coarse synchronization 82 is a resolution of the sync beacon by the node (i.e. reception of the sync beacon by the node and synchronization of the node clock with the master clock of FIG. 4) that takes place significantly less frequently than that of the sync transmission frequency. In embodiments of the current invention, coarse synchronization offers a significant advantage for nodes operating in a low power consumption mode, as described hereinbelow.

When the node (refer to FIG. 4) is operated in low power consumption mode, it may be powered off for relatively long periods of time—typically from minutes to an hour or more. In order to maintain substantially precise synchronization of the node clock with the master clock, and thereby enhance robustness of near-instantaneous node transmission when necessary, the node is periodically momentarily powered to allow reception and to perform coarse synchronization 82. A frequency for coarse synchronization 82 is typically on the order of 100 to 10,000 multiples of period 14.

In this way, a coarse beacon is transmitted, for example, at a frequency 10 times lower than the sync beacon. The coarse beacon may be transmitted by the master with additional transmission power or with longer duration than the sync beacon to further ensure all nodes can resolve the coarse beacon. The system and methods described hereinabove are applicable for a wide variety of communications configurations, such as but not limited to: home automation systems, surveillance systems, and other communications systems having star topology having nodes that are normally operating in a low power consumption mode and which need to communicate with the master on an infrequent basis.

It will be appreciated that the above descriptions are intended only to serve as examples, and that many other embodiments are possible within the scope of the present invention as defined in the appended claims.

What is claimed is:

1. A method of allocating channels in a PTMP (point-to-multi-point) system having a master and a plurality of nodes, the master having a master clock and each of said plurality of nodes having a node clock, the method comprising the steps of:
   a. transmission by the master to the nodes of a plurality of synch beacons, the sync beacons having a first frequency and a substantially fixed time period between successive sync beacon transmissions;
   b. synchronizing node clocks with transmitted synch beacons;
   c. dividing the time period into a slotted time and an unslotted time;
   d. allocating a plurality of slots in the slotted time for RF activity of the nodes that have resolved a sync beacon of a few last synch beacons of said plurality of synch beacons; and
   e. identifying the unslotted time for unallocated RF activity of certain nodes that have not resolved a sync beacon of a few last synch beacons of said plurality of synch beacons, said identifying being based on previous synchronization of respective clocks of said certain nodes with transmitted synch beacons.

2. A method of allocating channels according to claim 1, wherein at least one of the plurality of nodes stands by to receive the sync beacon for a duration of at least the time period, after which the node transmits during the unslotted time if the sync beacon is not resolved within a plurality of time periods.

3. A method of allocating channels according to claim 2, wherein the node transmits during the slotted time if the sync beacon is resolved within the plurality of time periods.

4. A method of allocating channels according to claim 3, wherein at least one of the plurality of nodes is operated in a low power consumption mode.

5. A method of allocating channels according to claim 4, wherein the low power consumption mode comprises a node normally not being powered to receive each sync beacon.

6. A method of allocating channels according to claim 5, wherein the node is periodically momentarily powered to perform a coarse synchronization.

7. A method of allocating channels according to claim 6, wherein the coarse synchronization is performed every n time periods, n ranging from 100 to 10,000.

8. A method of allocating channels according to claim 7, wherein the momentarily powering comprises a time duration of a plurality of time periods.

9. PTMP (point-to-multi-point) system having a master and a plurality of nodes, the system having an allocation of channels, the system comprising:
   a. a master clock and a node clock of each of said plurality of nodes;
   b. a plurality of synch beacons transmittable by the master to the nodes in accordance with said master clock, the sync beacon having a first frequency and a time period between successive sync beacon transmissions, said node clocks synchronizing with transmitted synch beacons;
   c. a division of the time period into a slotted time and an unslotted time;
   d. a plurality of slots allocatable in the slotted time for RF activity of the nodes that have resolved a sync beacon of a few last synch beacons of said plurality of synch beacons; and
   e. the unslotted time for unallocated RF activity of certain nodes that have not resolved a sync beacon of a few last synch beacons of said plurality of synch beacons, the unslotted time being determined in accordance with previous synchronization of respective clocks of said certain nodes with transmitted synch beacons.

10. The PTMP system according to claim 9, wherein at least one of the plurality of nodes is adapted to stand by to receive the sync beacon for a duration of at least the time period, after which the node is adapted to transmit during the unslotted time if the sync beacon is not resolved within a plurality of time periods.

11. The PIMP system according to claim 10, wherein the node is adapted to transmit during the slotted time if the sync beacon is resolved within the plurality of time periods.

12. The PIMP system according to claim 11, wherein at least one of the plurality of nodes is adapted to be operated in a low power consumption mode.

13. The PTMP system according to claim 12, wherein the low power consumption mode comprises a node adapted to normally not being powered to receive each sync beacon.

14. The PTMP system according to claim 13, wherein the node is periodically momentarily powered to perform a coarse synchronization.

15. The PTMP system according to claim 14, wherein the coarse synchronization is performable every n time periods, n ranging from 100 to 10,000.

16. The PTMP system according to claim 14, wherein the momentarily powering comprises a time duration of a plurality of time periods.

* * * * *

UNITED STATES PATENT AND TRADEMARK OFFICE
CERTIFICATE OF CORRECTION

| | | |
|---|---|---|
| PATENT NO. | : 8,619,754 B2 | Page 1 of 1 |
| APPLICATION NO. | : 12/354070 | |
| DATED | : December 31, 2013 | |
| INVENTOR(S) | : Haim Amir et al. | |

It is certified that error appears in the above-identified patent and that said Letters Patent is hereby corrected as shown below:

In the Claims:

Column 8

Claim 11, line 7 should be corrected as follows:
Change:
    -- The PIMP system according to claim 10, wherein the --
    to
    "The PTMP system according to claim 10, wherein the"

Column 8

Claim 12, line 10 should be corrected as follows:
Change:
    -- The PIMP system according to claim 11, wherein at --
    to
    "The PTMP system according to claim 11, wherein at"

Signed and Sealed this
Eighteenth Day of March, 2014

Michelle K. Lee
*Deputy Director of the United States Patent and Trademark Office*